Patented Dec. 22, 1936

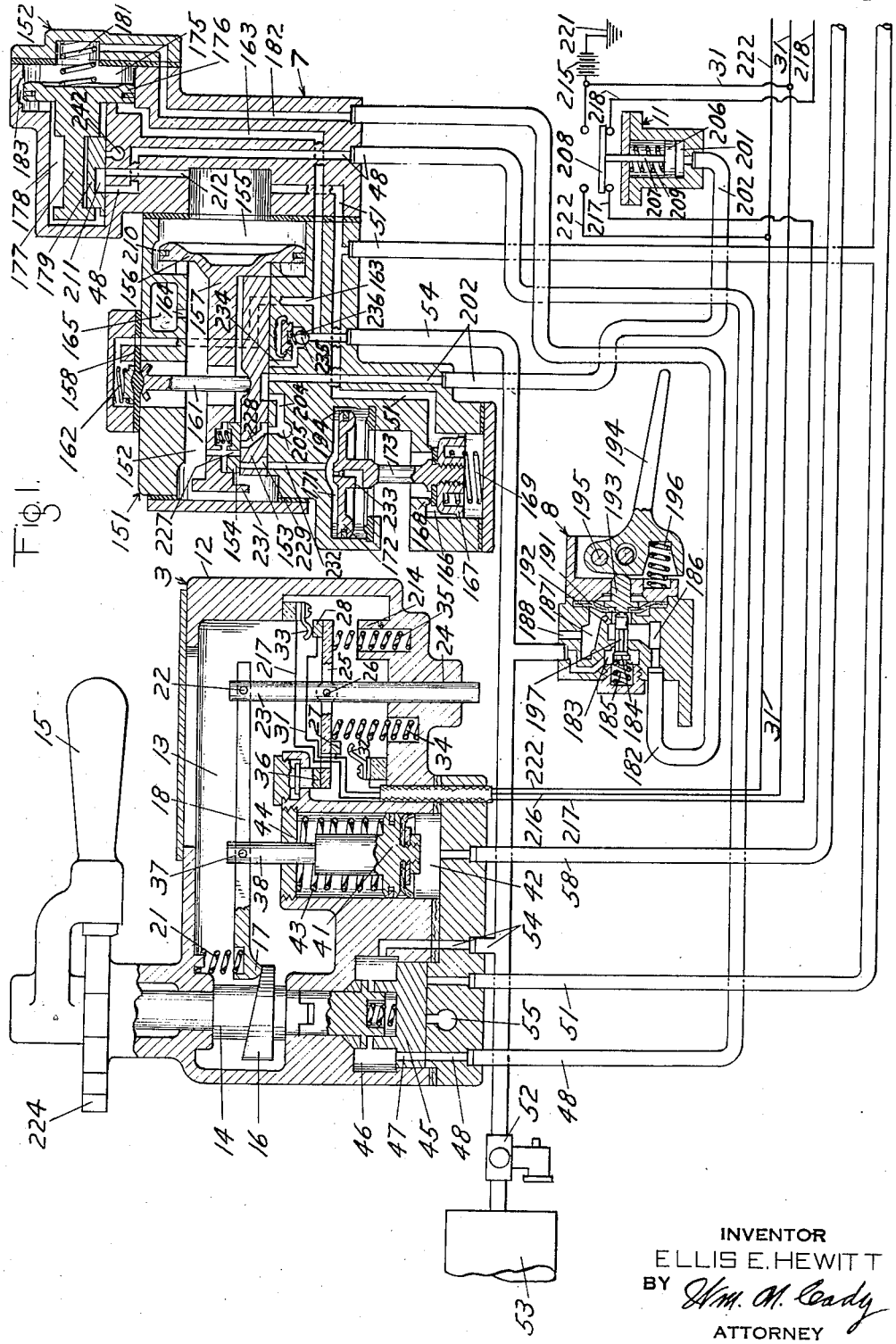

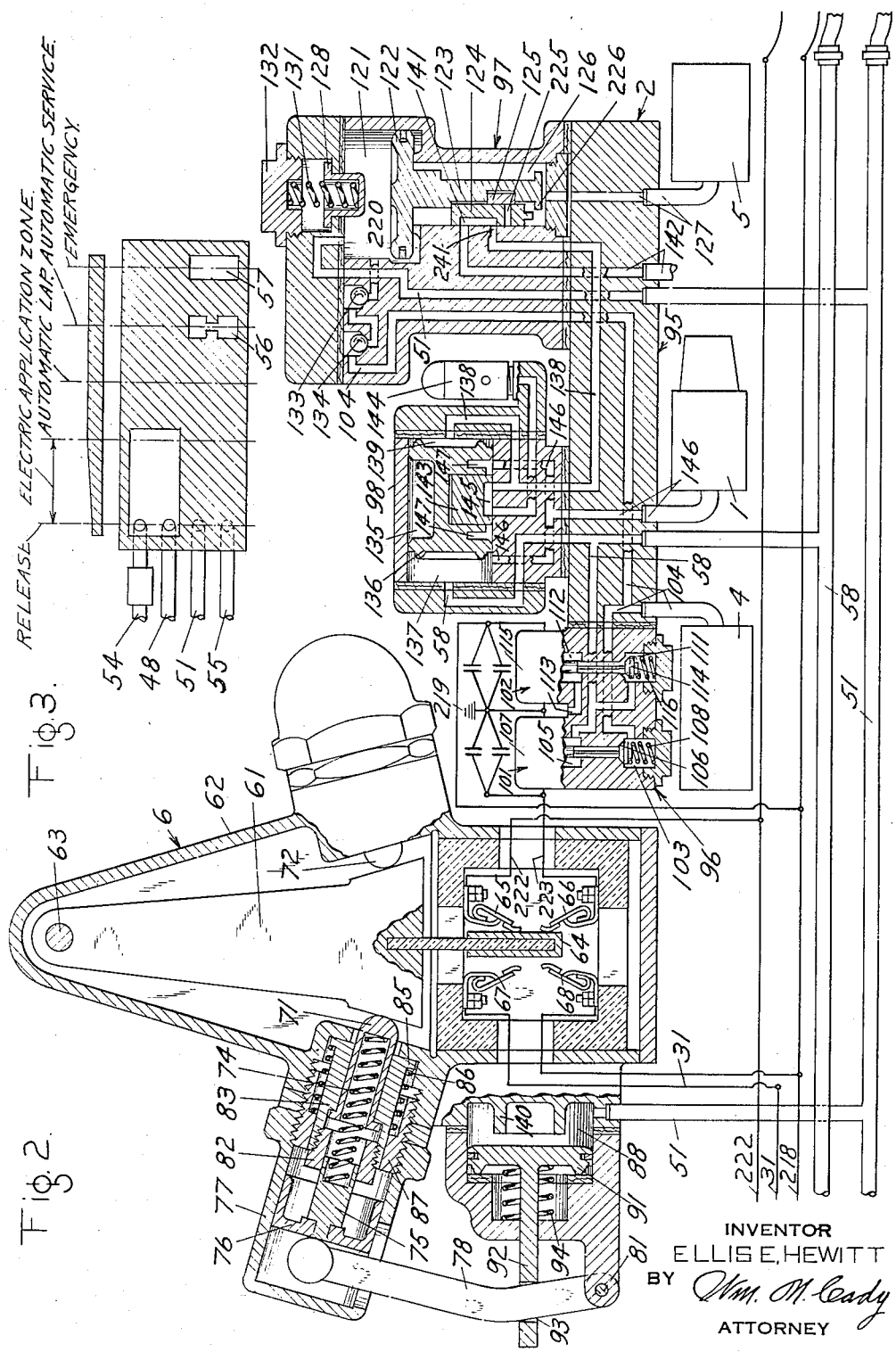

2,065,222

UNITED STATES PATENT OFFICE 2,065,222

TRAIN BRAKING SYSTEM

Ellis E. Hewitt, Edgewood, Pa., assignor to The Westinghouse Air Brake Company, Wilmerding, Pa., a corporation of Pennsylvania Application September 24, 1935, Serial No. 41,838

12 Claims. (Cl. 303—24)

This invention relates to a brake equipment for use on multiple unit cars and railway trains and more particularly to such equipment adapted for use on high speed trains.

In certain types of high speed train braking equipments, a straight air controlled portion is provided for controlling service applications of the brakes, and an automatic controlled portion is also provided for effecting service applications in the case of failure of the straight air controlled portion, and for effecting emergency applications.

An automatic emergency application of the brakes will result in the case of a broken train and may also be effected from any car of the train.

Uniform braking pressure is assured in the several brake cylinders in the case of the straight air controlled application, since the several brake cylinders are all supplied with fluid under pressure in accordance with the fluid pressure developed in the common straight air pipe. In the case of an automatic brake application, however, where upon a reduction in brake pipe pressure fluid under pressure is supplied to each brake cylinder from the associated auxiliary reservoir, there is a possibility that differences within the several brake cylinders may result, caused by leakage from the brake cylinder, variations in brake cylinder piston travel and the like, and which will produce different braking forces at different points in the train.

In accordance with my invention I provide a brake equipment comprising a straight air portion having fast application and release characteristics and provided with electrically controlled magnet valve devices of a control valve assembly for controlling the application and release of the brakes, and an automatic control portion that is capable of either service or emergency application. A retardation controller, in the form of an inertia responsive device, is provided for controlling the magnet valve devices of the straight air portion of the equipment to limit the degree of application of the brakes to prevent the rate of deceleration of the vehicle from exceeding a predetermined value. The automatic control portion is not under control of the retardation controller. When, however, an automatic emergency brake application is made, a transfer switch is operated to effect operation of the straight air portion of the equipment if the straight air equipment is in serviceable condition. The straight air portion of the equipment will overcome the automatic portion and the automatic brake application will be converted into a straight air application of the brakes which is under the control of the retardation controller. The setting of the retardation controller is influenced by the brake pipe pressure such that the venting of brake pipe air will effect a change in the setting of the retardation controller to permit a higher rate of deceleration of the vehicle than is effected during service application of the brakes.

It is an object of my invention to provide a fluid pressure brake equipment that is quick acting both in applying and in releasing the brakes.

It is another object of my invention to provide a brake equipment having a straight air controlled portion that is subject to the control of a retardation controller device, and having also an automatic controlled portion that is independent of the control of the retardation controller device.

It is a further object of my invention to provide for converting an automatic controlled application of the brakes into a straight air controlled application of the brakes when the straight air portion of the equipment proves to be in operating condition.

Other objects and advantages of my invention will be apparent from the following description of one embodiment thereof taken in connection with the accompanying drawings in which, Figs. 1 and 2 taken together comprise a diagrammatic view partly in section showing circuits and apparatus illustrating one preferred embodiment of the invention, and Fig. 3 is a diagrammatic view of the brake valve.

Referring to the drawings, each car or train braking unit may be provided with braking equipment including a brake cylinder 1 and a control valve assembly 2 that is controlled either electrically or pneumatically in accordance with the operation of a brake valve device 3, which comprises an electric self-lapping portion for controlling the electrical portion of the control valve assembly to effect the supply of fluid under pressure from the supply reservoir 4 to the brake cylinder 1, and from the brake cylinder 1 to the atmosphere, and which also comprises a pneumatic portion for controlling the pneumatic portion of the control valve assembly to effect the supply of fluid under pressure from the auxiliary reservoir 5 to the brake cylinder 1 to the atmosphere. A retardation controller device 6 is provided for limiting the degree of application of the brakes when effected by electrical control of the control valve assembly. A vent valve device 7 is provided for effecting a rapid venting of the brake pipe upon an initial reduction in brake pipe pressure at an emergency rate, such as may result from a broken brake pipe or by operation of the safety control system upon pressure being released from the lever of the foot valve device 8. A transfer switch 11 is provided that is operated upon operation of the vent valve device to effect a straight air application of the brakes.

The brake valve device 3 may comprise an electric self-lapping portion for controlling normal service applications of the brakes and a rotary valve portion for controlling auxiliary service and regular emergency applications, and is provided with a casing 12 defining a chamber 13 through one end of which an operating shaft 14 extends that is provided at its upper end with a brake valve handle 15.

A cam 16 for controlling the electric self-lapping portion is carried by the shaft 14. The upper face of the cam engages the rounded end 17 of a floating operating lever 18 that is urged downwardly against the face of the cam by a spring 21, that is positioned between the upper wall of the brake valve casing structure and the end 17 of the lever 18. The other end of the floating lever 18 is pivotally connected by a pin 22 to a guiding and actuating member 23 that is interfitted within a bore 24 in the brake valve casing. A contact carrying lever 25 is pivotally connected by a pin 26 to the guide member 23, and carried movable contact members 27 and 28 that are connected to a common conductor 31 and are adapted to engage, respectively, the fixed contact members 32 and 33 mounted on the casing structure, as shown. The contact carrying lever 25 is urged upwardly by springs 34 and 35, the lower ends of which are inserted in recesses in the casing structure and the upper ends of which engage the left hand end and the right hand end, respectively, of the contact carrying lever 25 as viewed in the drawings, and press upwardly until the left hand end thereof engages a stop 36 and the contact member 28 on the right hand end engages the contact member 33, unless and until the contact carrying lever 25 is forced downwardly by the floating lever 18 and the guide member 23.

The floating lever 18 is pivoted at a point intermediate its end on a pin 37 that is supported in a stem 38 that extends upwardly from a self-lapping piston 41 contained in the piston chamber 42. A spring 43 is positioned about the stem 38 having its lower end in engagement with a self-lapping piston 41 and its upper end in engagement with a nut 44 urges the piston 41 downwardly to its illustrated position. The relative forces exerted by the spring 43 and the springs 34 and 35 are such that when the left hand end 17 of the floating lever 18 is in its lower or illustrated position, the springs 34 and 35 exert a sufficient upward force on the contact carrying lever 25 and the guide member 23 to effect separation of the contact members 27 and 32 and engagement of the contact members 28 and 33.

The rotary valve 45, contained within a valve chamber 46, is provided with a port 47 that is adapted to register with a passage 48 leading through the pipe 48 and the vent valve device 7 to the brake pipe 51, so that fluid at a reduced pressure, as supplied through the feed valve device 52 from the main reservoir 53 and the main reservoir pipe and passage 54 is supplied through the port 47 to the pipe 48 and the brake pipe 51.

In pneumatic service position the brake pipe 51 is connected to the atmosphere exhaust port 55 through a cavity 56, see Fig. 3, and in pneumatic emergency position the brake pipe 53 is connected to the exhaust port 55 through a cavity 57.

The straight air pipe 58 communicates with the piston chamber 42 containing the self-lapping piston 41, and also with the magnet valve application valve chamber 103 and with one side of the check valve device of the control valve assembly for a purpose to be later explained.

The retardation controller 6 comprises an inertia device such as a pendulum 61, contained within a casing 62 and pivotally supported thereto by a pivot pin 63. The pendulum 61 is adapted, upon a predetermined movement towards the left, to move the contact member 64, carried at the lower end thereof, out of engagement with fixed contact members 65 and 66 and upon a further predetermined movement toward the left to bring the contact member 64 into engagement with the contact members 67 and 68.

The pendulum 61 is engaged by spring pressed plungers 71 and 72, that restrict its movement from a vertical position. The plunger 71 is provided with a central bore for accommodating a spring 74, one end of which is in engagement with the lower end of the bore, and the other end of which is in engagement with an adjusting member 75 carried by a guide member 76 within a bore in the casing portion 77 of the retardation controller structure, and which is adapted to engage one end of a lever 78 pivotally mounted on the casing structure by the pivot pin 81. The adjusting member 75 moves within a bore within a stop member 82 that is attached within the other end of a sleeve 83, the lower end of which surrounds and supports the plunger 71. The plunger 71 is provided at its outer end with an outwardly extending flange 84 that engages a shoulder on the sleeve 83 to limit the movement of the plunger toward the pendulum. The lower end of the sleeve 83 is provided with an outwardly extending flange 85 that engages a portion of the controller casing to limit its inward movement, and to accommodate a spring 86 that is positioned about the sleeve. The lower end of the spring 86 engages the outwardly extending flange 85 and the upper end is contained within an inwardly extending shoulder in a sleeve 87 attached to the controller casing.

A piston chamber 88 is provided in the lower part of the controller casing that is in constant communication with the brake pipe 51, and that contains a piston 91 having a stem 92 provided with an opening 93 surrounding the lever 78. A spring 94 is provided surrounding the stem 92 between the inner face of a piston 91 and the outer wall of the casing, the force of which opposes the force of the pressure within the piston chamber 88.

Upon some predetermined rate of deceleration of the vehicle, assuming the movement of the vehicle to be toward the left as viewed in Fig. 2, the inertia of the pendulum 61 will be sufficient to move it and the plunger 71 toward the left against the bias of the spring 74 until the flange 84 engages the stop 82 and the switch contact member 64 is moved out of engagement with the fixed contact members 65 and 66. The force of the spring 86 is sufficient to maintain the sleeve 83 in its illustrated position in which the sleeve flange 85 is maintained in engagement with the controller casing. Upon a predetermined greater rate of deceleration of the vehicle, the inertia of the pendulum 61 will force the plunger 71 further toward the left causing the stop member 82 and the sleeve 83 to move against the bias of the spring 86 until the switch contact member 64 is brought into engagement with the switch contact members 67 and 68 to complete a circuit between them. The parts associated with the spring pressed plunger 72 are identical in construction and operation with those associated with the spring pressed plunger 71 excepting that the adjusting member 75 is screw-threadedly attached to the stop member 82 and is adjustable by screw-threadedly varying the position of the adjusting nut with respect to the stop member rather than by a lever corresponding to 78.

So long as normal brake pipe pressure is maintained within the piston chamber 88 the piston 91 is forced against a shoulder on the casing, as illustrated, and the lever 78 is in its extreme left hand position, thus effecting a predetermined force on the outer end of the spring member 74 to effect a predetermined adjustment of the force required by the pendulum 61 to move the contact member 64 out of engagement with the contact members 65 and 66. Upon a predetermined reduction in brake pipe pressure the spring 94 forces the piston 91 and the stem 92, operating the lever 78, toward the right to force the adjusting member 75 toward the pendulum 61 and effect a compression of the spring 74 such as to require a greater force of inertia of the pendulum 61 to cause movement of the contact member 64 out of engagement with the contact members 65 and 66, and a correspondingly greater force necessary to cause engagement of the contact member 64 with the contact members 67 and 68.

The control valve assembly 2 comprises a pipe bracket section 95, a magnet valve section 96, a triple valve section 97, and a double check valve section 98. The magnet valve section 96 comprises an application magnet valve device 101 and a release magnet valve device 102. The application magnet valve device 101 comprises a casing containing an application valve chamber 103 that is in constant communication through passage and pipe 104 with the supply reservoir 4, and a chamber 105 that is in constant communication with the straight air passage and pipe 58. Communication between these two chambers is controlled by an application valve 106 operatively connected to a magnet 107 of the magnet valve device. A spring 108 is provided in the application valve chamber 103 to force the application valve 106 toward its seat.

The release magnet valve device 102 comprises a casing containing a release valve chamber 111, that is in constant communication with the straight air passage and pipe 58, and a chamber 112 that is in constant communication with the atmosphere through the exhaust port 113. A release valve 114 is provided within the release valve chamber 111, that is operatively connected to the magnet 115 in the upper portion of the casing. A spring 116 is provided in the release valve chamber to force the release valve 114 to its seat.

The triple valve section 97 comprises a casing having a piston chamber 121 that is in constant communication with brake passage and pipe 51, and that contains a piston 122 provided with a stem 123 that operatively engages a slide valve 124 and a graduating valve 125 contained within a slide valve chamber 126 within the casing of the triple valve section that is in constant communication, through passage and pipe 127, with the auxiliary reservoir 5. A graduating stem 128 is provided above the piston 122, and is forced to its lower illustrated position by a spring 131, the lower end of which terminates in the lower end of a bore within the graduating piston 128, and the upper end of which terminates in a bore in a cap nut 132. Double check valves 133 and 134 are provided in the triple valve section for controlling the charging of the supply reservoir 4 from the piston chamber 121 through the passage and pipe 104.

The double check valve section 98 comprises a casing having a chamber 135 containing a piston valve 136 for controlling communication to the brake cylinder 1 and which provides a chamber 137 to the left of the valve 136 and a chamber 139 to the right thereof, as viewed in Fig. 2. The left hand chamber 137 is in constant communication with the straight air passage and pipe 58. The right hand chamber 139 is in communication with the atmosphere through passage 138, the cavity 141 in the slide valve 124 of the triple valve device, and the passage and pipe 142 with the triple valve piston and stem in their release position. A slide valve 143 is operatively connected to the stem of the piston valve 136 and contains a groove 145 through which a safety valve device 144 is connected to the passage 138 when the piston valve 136 and the slide valve 143 are in their illustrated positions the valve 136 seating against its right hand face. Passage and pipe 146 connects either the chamber 137 or the chamber 139 of the double check valve device with the brake cylinder 1 depending upon the position of the piston valve 136. A cavity 147 in the piston valve 136 connects the left hand branch of the passage 146 to the passage 138 when the piston valve 136 is seated against its left hand face.

The vent valve device 7 comprises an emergency valve portion 151 and a safety control vent valve portion 152. The emergency valve portion 151 comprises a casing defining a slide valve chamber 152 containing a main slide valve 153 and a graduating valve 154, and defining a piston chamber 155 containing a piston 156 having a stem 157 that extends into the chamber 152 and is recessed to receive the graduating valve 154 and is operatively connected to the main slide valve 153.

The main slide valve 153 is held upon its seat by a loading mechanism comprising a flexible diaphragm 158 mounted in the casing of the valve device, and adapted to be urged into engagement with a rocking stem 161 bearing upon the main slide valve 153. A spring 162 exerts a constant downward pressure upon the flexible diaphragm 158. The chamber above the diaphragm 158 is in constant communication through a passage 163 with the feed valve pipe 54, so that fluid under pressure corresponding to feed valve pipe pressure is at all times supplied to the chamber above the flexible diaphragm 158.

The slide valve chamber 152 is in communication, by way of a passage 164, with a quick action chamber 165 formed in the casing of the emergency valve portion of the vent valve device. The emergency piston chamber 155 is in communication with brake pipe passage and pipe 51.

Formed in the lower part of the casing of the emergency valve portion is a vent valve chamber 166 that is in constant communication with brake pipe passage and pipe 51 and which contains a vent valve 167 that is normally forced to its rib seat 168 by a spring 169. The vent valve 167 controls the flow of fluid under pressure from the brake pipe 51 to the atmosphere.

To provide means for operating the vent valve 167 from its seat a vent valve piston chamber 171 is provided in the casing, containing a piston 172 having a stem 173 operatively connecting the piston to the vent valve 167. When fluid under pressure is supplied to the piston chamber 171 the vent valve piston 172 and the vent valve 167 are forced downwardly, unseating the valve and releasing fluid under pressure from the brake pipe 51 to the atmosphere. When the flow of fluid under pressure to the piston chamber 171 takes place at a slow rate it may leak around the piston by way of a groove 174 and thus flow to the atmosphere without actuating the piston 172 to unseat the vent valve.

The main slide valve 153 is adapted to control the ports and passages for a purpose and in a manner which will be more fully described in the description of operation of the equipment.

The safety control vent valve portion 152 comprises a casing having a piston chamber 175 containing a piston 176 provided with a stem 177 that extends into a slide valve chamber 178, also provided in the casing, and which contains a slide valve 179 that is operatively engaged by the piston stem 177.

A spring 181 is provided in the piston chamber 175 for urging the piston 176 and the slide valve 179 towards the left, or to their illustrated position. The slide valve chamber 178 is in constant communication with the feed valve pipe 54 through passage 163. The piston chamber 175 is also normally in communication with the feed valve pipe 54 through passage and pipe 182, and the foot valve device 8, as will presently appear. A leakage groove 183 is provided for equalizing the pressures on either side of the piston 176 when in this position to prevent undesired operation. The safety control vent valve portion 152 operates to effect an emergency application of the brakes in response to operation of safety control devices, of which the foot valve device 8 is illustrative.

The foot valve device 8 comprises a casing in which is provided a valve chamber 183, that is in constant communication with the feed valve pipe 54, and contains a valve 184 that is urged towards its seat by a spring 185. The valve 184 is adapted to control communication between the chamber 183 and an intermediate chamber 186 of the foot valve device, which is in constant communication through the safety control pipe and passage 182 with the piston chamber 155 of the safety control vent valve portion. Communication between this intermediate chamber 186 and an exhaust chamber 187, that is in constant communication with the atmosphere through an exhaust port 188, is controlled by a diaphragm valve 191 that is adapted to be forced to its seat 192 by an operating stem 193 upon the downward movement of a foot valve lever 194, that is pivotally supported on a pin 195. A spring 196 is provided for forcing the lever 194 upwardly when pressure thereon is released. The valve 184 is provided with a stem 197 for engaging the diaphragm valve 191 to force the valve 191 from its seat when the valve 184 is forced to its seat.

The transfer switch 11 comprises a casing having a piston chamber 201 that is normally in communication with the atmosphere through pipe and passage 202, the cavity 203 of the main slide valve 153 of the emergency valve portion, passage 204, and exhaust port 205. The piston chamber 201 contains a piston 206 having a stem 207 extending upwardly through the top of the casing and carrying a switch contact member 208 having two operative circuit closing positions. A spring 209 is provided within the casing about the stem 207 for forcing the piston 206 and the switch contact member 208 downwardly.

The system is charged as follows. Fluid under pressure flows from the main reservoir 53 through the feed valve device 52 to the feed valve pipe 54 at feed valve pressure and from the pipe 54, through passage 163 to the slide valve chamber 178 of the safety control portion 152 of the vent valve device 7, and also from the passage 163 to the loading chamber above the diaphragm 158 of the emergency valve portion. In order to complete the charging of the system it is necessary to apply pressure to the lever 194 of the foot valve device 8, holding the lever in its lower or illustrated position, and effecting communication from the feed valve pipe 54 through the valve chamber 183, past the unseated valve 184 to the middle chamber 186, and through pipe and passage 182 to the piston chamber 175 of the safety control vent valve portion, thus maintaining the piston 176 and the slide valve 179 in their illustrated positions to permit the charging of the brake pipe in the manner to be presently described.

Fluid under pressure also flows from the feed valve pipe 54 to the rotary valve chamber 46 of the brake valve device 3, through port 47, passage and pipe 48, to the vent valve device, through cavity 211 in the slide valve 179 of the safety control portion, and passage 212 to the piston chamber 155 of the emergency valve portion of the vent valve device, and from piston chamber 155 through passage and pipe 51 to charge the brake pipe. Fluid under pressure flows from the piston chamber 155 past the piston 156, through the feed groove 210 to charge the slide valve chamber 152, and from the slide valve chamber through the port 164, to charge the quick action chamber 165.

One branch of the brake pipe 51 terminates in the seat of the rotary valve of the brake valve device 3, at which point communication is closed by the valve 45 when in its release and charging position. Another branch of the brake pipe 51 is connected to the piston chamber 88 of the retardation controller device which, when charged, forces the piston 91 toward its left face against the bias of the spring 94 to set the retardation controller to effect a service rate of retardation of the vehicle.

The brake pipe 51 extends rearwardly through the train having branches at each control valve assembly 2 controlling one of the braking units of the train, one only of which is illustrated in Fig. 2. Through such branch pipe the piston chamber 121 of the triple valve portion of the control valve assembly is charged, from which, fluid under pressure flows past the piston 122 through the feed groove 220 to the slide valve chamber 126, and through passage and pipe 127 to the auxiliary reservoir 5 to charge the slide valve chamber and the auxiliary reservoir. Fluid under pressure also flows from piston chamber 121 past the double check valves 133 and 134 to the passage and pipe 104 to charge the supply reservoir 4, and the application valve chamber 103 of the magnet valve portion. The check valves 133 and 134 prevent the flow of fluid under pressure from the supply reservoir 4 to the piston chamber 121 upon a reduction in brake pipe pressure, thus retaining supply reservoir pressure for service application of the brakes.

If the operator wishes to make a service application of the brakes, the handle 15 of the brake valve device 3 is moved from its release position to a position within its electric application zone, depending upon the desired degree of application of the brakes. As the brake valve handle 15 is thus moved the cam 16 is rotated about its axis thus raising the end 17 of the floating lever 18 which pivots about the pin 37 forcing the actuating member 23 downwardly. Upon downward movement of the actuating member 23 and the pivot pin 26, the contact carrying arm 25 pivots about the stop 36, the left hand end of the lever being held in engagement with the stop 36 by the spring 34 until the right hand end of the lever has moved downwardly sufficient to cause separation of the contact members 28 and 33 against the bias of the spring 35, it being understood that the spring 34 exerts a greater force than does the spring 35, thus maintaining the left hand end of the contact carrying lever 25 in engagement with the stop 36. The downward movement of the right hand end of the contact carrying lever 25 continues until it is brought into engagement with a stop 214, which serves as a fulcrum for further movement of the contact carrying lever 25 upon further downward movement of the operating member 23, and causes the left hand end of the lever 25 to move downwardly until the contact member 27 engages the contact member 32.

When the brake valve device is in its illustrated, or release position a circuit is completed from the battery 215 through conductor 31, contact members 28 and 33 of the brake valve device, conductor 217, the switch contact member 208 of the transfer switch in its lower position, conductor 218, and the winding of the magnet 115 of the release magnet valve device 102, to ground at 219, and to the grounded terminal 221 of the battery 215. The magnet 115, thus energized, forces the release valve 114 downwardly from its seat against the bias of the spring 116, thus effecting communication from the straight air pipe 58 to the atmosphere through the chamber 112 and exhaust port 113.

Upon separation of the contact members 28 and 33 of the brake valve device, as above described, when the brake valve handle 15 is moved from its release position this circuit is interrupted, thus deenergizing the magnet 115 of the release magnet valve device 102 and permitting the spring 116 to force the release valve 114 to its seat to cut off communication from the straight air pipe 58 to the atmosphere. Upon the further movement of the lever 25 downwardly to cause engagement of the contact members 27 and 32 a circuit is completed from the positive terminal of the battery 215, through conductor 31, the contact members 32 and 27, conductor 222, the contact members 64, 65 and 66 of the retardation controller device 6, conductor 223, the winding of the magnet 107 of the application magnet valve device 101, to ground at 219, and to the grounded terminal 221 of the battery 215. The energization of this circuit forces the application valve 106 downwardly from its seat against the bias of the spring 108 thus effecting communication from the supply reservoir 4 to the straight air pipe 58, from which fluid under pressure flows to the chamber 137 to the left of the piston valve 136 of the double check valve section 98 of the control valve assembly, forcing the piston valve 136 toward the right to open communication through the left hand branch of the passage 146 to the brake cylinder pipe 146, to supply fluid under pressure to the brake cylinder 1.

As fluid under pressure is thus supplied to the brake cylinder, fluid also flows from the straight air pipe 58 to the self-lapping piston chamber 42 of the brake valve device 3, causing the pressure within the chamber 42 to correspond to that supplied to the brake cylinder 1. As pressure within the piston chamber 42 increases the upward force on the self-lapping piston 41, this force acts against the downward force of the spring 43 to move the piston 41 and its stem 38 upwardly, causing the floating lever 18 to fulcrum about its rounded end 17 to move the actuating member 23 and the pivot pin 26 upwardly. As the pivot pin 26 moves upwardly the spring 34 causes the contact carrying lever 25 to fulcrum about its right end, on the stop 214, thus causing the contact members 27 and 32 to separate. Upon separation of the contact members 27 and 32, the circuit through these contact members and through the winding of the magnet 107 of the application magnet valve device 101 is interrupted and the spring 108 urges the application valve 106 to its seat, cutting off further flow of fluid to the brake cylinder and to the self-lapping chamber 42.

The greater the movement of the handle 15 of the brake valve device from its release position the greater will be the upward movement of the rounded end 17 of the floating lever 18 on the cam 16 and consequently the greater will be the required upward movement of the pivot pin 37 carried by the stem 38, and of the piston 41 to effect rotation of the floating lever 18 about the end 17 to a self-lapping position. Consequently, the greater will be the pressure within the self-lapping chamber 41 necessary to oppose the downward force of the spring 43 to effect a self-lapping position of the contact carrying lever 25. It follows that the brake valve device 3 operates as a self-lapping brake valve to effect a supply of fluid under pressure to the brake cylinder at a value dependent upon the amount of movement of the handle 15 within its electric application zone.

In a similar manner, movement of the brake valve handle 15 from a position within its electric application zone toward its release position effects a corresponding movement of the cam 16, and a lowering of the fulcrum point formed by engagement of the cam with the grounded end 17 of the floating lever 18. This causes the lever 18 to pivot about the pin 37 to move its right hand end, together with the contact carrying lever 25, upwardly to cause engagement of the contact members 28 and 33 to effect the energization of the winding of the magnet 115 of the release magnet valve device 102, which forces the release valve 114 downwardly from its seat against the force of the spring 116 and permits the flow of fluid under pressure from the brake cylinder 1, the straight air pipe 58, and the self-lapping piston chamber 42, to the atmosphere through exhaust port 113. Should the operator move the brake valve handle 15 only part of the way from its previous position toward release position, to partially release the brakes, the rounded end 17 of the floating lever 18, upon its downward movement, will engage the cam 16 at some intermediate point, thus causing the lever 18 to fulcrum about the end 17 and cause the pivot 22 and actuating member 23 to move downwardly to effect separation of the contact members 28 and 33 to deenergize the release magnet valve device 102.

If, while the brakes are being applied, and the contact members 27 and 32 are in engagement, effecting the supply of fluid under pressure through the application magnet valve device 101 to the brake cylinder 1 and the piston chamber 42 of the brake valve device 3, and assuming that the vehicle is moving in such direction as to carry the pendulum 61 of the retardation control device 6 towards the left as viewed in Fig. 2, and if, while the brakes are so applied, the rate of retardation of the vehicle becomes sufficient to cause the pendulum 61 to swing toward the left to actuate the spring pressed plunger 71 against the stop member 82, the switch contact member 64 will interrupt the circuit through the contact members 65 and 66. The circuit through the winding of the magnet 107 of the application magnet valve device 101, thus interrupted, permits the spring 108 to force the application valve 106 to its seat and close communication from the supply reservoir 4 to the brake cylinder 1 and to the straight air pipe 58, thus preventing a further degree of application of the brakes. In this position of the retardation controller pendulum, the application and release magnet valves 106 and 114, respectively, will be in lap position.

If the rate of retardation of the vehicle becomes sufficient to cause the pendulum 61 to swing further toward the left, so as to move the spring pressed plunger 71 and the stop member 82 carrying the sleeve 83 against the pressure of the spring 86, the switch contact member 64 will be brought into engagement with its switch contact members 67 and 68, thus closing the above traced circuit through the winding of the magnet 115 of the release magnet valve device 102, to force the release valve 114 downwardly against the force of the spring 116, and effect the release of fluid under pressure from the brake cylinder 1 and the straight air pipe 58 in the manner above described, until the rate of retardation of the vehicle has become sufficient to cause the pendulum 61 to swing toward the right a sufficient amount to permit the switch contact member 64 to move out of engagement with the contact members 67 and 68 to interrupt the circuit through the winding of the magnet 115, and permit the spring 116 to force the release valve 114 to its seat.

If, for any reason, the straight air portion of the brake equipment should be rendered inoperative, such as by interruption of the circuits through the wires leading from the brake valve device to the application magnet valve device and the release magnet valve device, the operator may effect an automatic application of the brakes by movement of the brake valve handle beyond its electric application zone to its automatic service application position as defined by the notch plate 224, and as shown diagrammatically in Fig. 3. It will be apparent, by reference to Fig. 3, that when the rotary valve 45 is in a release zone, and the triple valve which controls the automatic application of the brakes is in its release position for any position of the brake valve lever 15 within the electric application zone, and in automatic lap position. The automatic service application position and the automatic emergency application position of the lever 15 and of the rotary valve 45 are beyond the electric application zone.

If the operator desires to effect a pneumatic service application of the brakes he moves the brake valve handle 15 to its automatic service application position, in which position fluid under pressure is vented from the brake pipe 51 at a restricted rate through the cavity 56 in the rotary valve 45, and the exhaust port 55. The reduction in brake pipe pressure thus effected causes a corresponding reduction in pressure in the piston chamber 121 of the triple valve portion of the control valve assembly, and within the emergency piston chamber 155 of the vent valve device. The reduction in pressure within the piston chamber 121 of the triple valve device causes the piston 122 and the piston stem 124 to be moved upwardly, first moving the graduating valve 125 to uncover the port 225 in the main slide valve 124, and then, upon engagement of a shoulder 226 on the lower end of the stem 123 with the end of the main slide valve, the slide valve 124 is moved until the port 225 registers with the passage 138, thus closing communication from passage 138 to the exhaust passage 142 through the cavity 141 in the slide valve, and effecting communication from the auxiliary reservoir 5 and the slide valve chamber 126 to the brake cylinder 1 through the port 225 in the main slide valve, passage 138, to the chamber 139 at the right hand end of the double check valve 136 causing pressure to build up to force the valve to seat on its left face, and to open communication from the chamber 137 at the right of the piston valve 136 through the right branch passage 146, and pipe 146 to brake cylinder 1. The supply of fluid under pressure from the auxiliary reservoir 5 to the brake cylinder 1, through the passages just described, continues until the pressure within the slide valve chamber 126 on the under side of the triple valve piston 123 decreases to a value corresponding to, or slightly less than, the pressure on the upper side of the piston 122 when the piston and stem 123 are moved downwardly until the graduating valve 125 laps the port 225 and closes communication through the passage 138 to the brake cylinder 1, thus maintaining brake cylinder pressure at a value corresponding to the amount of reduction in brake pipe pressure.

The reduction in pressure in the emergency piston chamber 155 causes the emergency piston 156 and its stem 157 to move toward the right slightly, or until the port 227 in the graduating valve 154 is brought into registration with the port 228 in the main slide valve 153, registering with the exhaust port 205. At the same time feed groove 210 is closed by piston 156. Fluid under pressure is then vented from the quick action chamber 165 through port 164, and from the slide valve chamber 152, to the atmosphere through the ports 227, 228, and the exhaust port 205. The size of the port 227 is such that the rate of reduction in pressure on the left hand side of the piston 156 corresponds substantially to a service rate of reduction in pressure in the piston chamber 155, so that, in automatic service application, the piston 156 and stem 157, do not move to the right sufficiently to effect the supply of fluid under pressure to the piston chamber 171 of the vent valve device.

If the operator wishes to make an emergency application of the brakes the handle 15 is moved to its automatic emergency position thus rotating the valve 45 to such position that the cavity 57 therein effects communication from the brake pipe 51 to the atmosphere through the exhaust port 55 to effect an emergency rate of reduction in brake pipe pressure. When the pressure in the brake pipe is reduced at an emergency rate the reduction in pressure on the right hand side of the piston 156 takes place more rapidly than fluid under pressure can be vented through the port 227 in the graduating valve 154 so that the pressure in the slide valve chamber 152 forces the piston 156 and the graduating valve 154 toward the right until the passage 228 is lapped and the end of the port 229 through the main slide valve 153 is uncovered. This effects communication from the main slide valve chamber 152 to the vent valve piston chamber 171 through port 229 and passage 232 to effect the supply of fluid under pressure from the quick action chamber 165 and the slide valve chamber 152 to the piston chamber 171 to force the piston 172 and the vent valve 167 downwardly from its seat 168 to effect a rapid reduction in brake pipe pressure past the unseated vent valve.

This rapid reduction in brake pipe pressure and in the pressure in the piston chamber 155 causes the piston 156 and its stem 157 to move further toward the right, the shoulder 131 on the end of the piston stem engaging and moving the main slide valve 153 to uncover the end of the passage 232 to permit the flow of fluid under pressure past the end of the slide valve to the piston chamber 171. The movement of the slide valve 153 toward the right, as just described, brings the cavity 203 therein to a position to effect communication between the feed valve pipe 54 and the transfer switch passage and pipe 202 through a passage 234 past the unseated check valve 235, thus supplying fluid under pressure to the piston chamber 201 of the transfer switch device 11, to force the piston 206 and the contact member 208 upwardly against the bias of the spring 209 to interrupt communication between the conductors 217 and 218 and effect communication between the positive terminal of the battery 215 and the conductor 222. The check valve 235 is weighted by a spring 236 to effect a differential in pressure between the feed valve 54 and the transfer switch device 202.

Movement of the contact member 208 of the transfer switch device 11 from its illustrated position to its upper contact making position interrupts the circuit through the winding of the magnet 115 of the release magnet valve device 102, that is normally completed from conductor 31 through contact members 28 and 33 of the brake valve device, and conductors 217 and 218. Upon deenergization of the magnet 115, the spring 116 forces the release valve 114 to its seat as above described, thus closing communication between the brake cylinder 1 and the atmosphere through the exhaust port 113. The contact member 208 of the transfer switch device 11, in its upper position, completes a circuit from the positive terminal of the battery 215, through conductor 222, the contact members 65, 64 and 66 of the retardation controller device 6, the conductor 223 through the winding of the magnet 107 of the application magnet valve device 101 to ground at 219, and to the grounded terminal 221 of the battery 215. The energization of the winding of the magnet 107 forces the application valve 106 downwardly against the bias of the spring 108 thus effecting the supply of fluid under pressure from the supply reservoir to the brake cylinder 1 as previously described.

This operation of the transfer switch 11 causes the emergency application of the brakes, initiated by an emergency rate of reduction in brake pipe pressure, to be transferred to an electric application of the brakes through the circuits controlled by the retardation controller 6, so that the rate of retardation of the vehicle may be regulated. The reduction in brake pipe pressure may be effected by any cause, such as by operation of a conductor's valve, or rupture of the brake pipe, while the handle 15 of the brake valve device remains in release position.

Upon a reduction in brake pipe pressure, the pressure within the piston chamber 88 of the retardation controller device 6 is correspondingly reduced, thus permitting the piston 91 and the stem 92 thereof to be moved toward the right by the force of the spring 94 against the stop 140 thus moving the upper end of the lever 78 and the adjusting member 75 toward the right to increase the pressure on the spring 74 to change the setting of the retardation controller, so that a greater rate of retardation of the vehicle and a corresponding greater force of the pendulum 61 against the spring pressed plunger 71 is required to move the contact member 64 out of engagement with the contact members 65 and 66, to interrupt the circuit through the winding of the application magnet valve device 101, and a corresponding greater force of inertia of the pendulum 61 is required to move the plunger 71 to a position to cause engagement of the contact member 64 with the contact members 67 and 68 to effect the operation of the release magnet valve device 102 to release fluid under pressure from the brake cylinder to limit the rate of retardation of the vehicle. The vehicle will therefore be brought to rest with a greater rate of retardation than is effective when service application of the brakes is made.

Upon reduction in brake pipe pressure at an emergency rate, the pressure in the piston chamber 121 of the triple valve section of the control valve assembly 2 is correspondingly reduced, thus causing the piston 122 and the piston stem 123 to be moved upwardly with such force against a graduated stem 128 as to cause a spring 131 to be compressed, and lower end of the slide valve 123 to be moved to uncover the end of the passage 138 to supply fluid under pressure from the auxiliary reservoir through the slide valve chamber 126 and passage 138 to the chamber 139 at the right of the piston valve 136 of the double check valve device 98. A choke 241 is provided in the passage 138 so that the pressure within the chamber 139 builds up at a slower rate than pressure within the chamber 137 provided the magnet valve devices 101 and 102 have operated to effect the supply of fluid under pressure from the supply reservoir to the brake cylinders through the chamber 137.

Should the magnet valve devices not operate properly, and should the pressure within the chamber 137, therefore, fail to build up, pressure within the chamber 139 will force the piston valve 136 toward the left to seat on its left face against the end of the chamber 137, and effect communication from the chamber 139 through the right hand branch of the passage 146, and brake cylinder pipe 146, to the brake cylinder 1, and at the same time, bring the right hand end of the cavity 147 in the piston valve 136 into registration with the end of the passage 138 in the valve seat, and the left hand end of the groove 147 into registration with the left hand branch of the passage 146, terminating in the valve seat, to effect communication from the passage 138 through the groove 147 in the piston valve 136, and through passage and pipe 146 to the brake cylinder 1.

Should the operator release pressure on the foot lever 194 of the foot valve device 8, this lever will be forced upwardly by the spring 196, and the spring 185 will force the valve 184 to its seat, closing communication from the feed valve pipe 54 through the foot valve device to the safety control pipe 182, the valve stem 197 forcing the diaphragm valve 191 and the stem 193 toward the right, thus raising the diaphragm valve from its rib seat 192 to effect communication from the safety control pipe 182 past the unseated diaphragm valve 191, through chamber 187, and exhaust port 188 to the atmosphere, to vent fluid under pressure from the piston chamber 175 of the safety control vent valve portion. The greater force on the left hand side of the piston 176 therefore forces the piston 176 and the piston stem 175 toward the right against the bias of the spring 181, thus moving the slide valve 179 to lap the end of the passage 48, through which the brake pipe 51 is charged, and to bring the groove 211 in the slide valve 179 to a position to effect communication between the passage 212 and the exhaust port 242, to vent fluid under pressure from the emergency piston chamber 155 and the brake pipe 51 at an emergency rate to effect an emergency application of the brakes in the manner above described.

It will be appreciated that the operation of the transfer switch device 11 and the mechanism controlled thereby has particular utility when an application of the brakes is effected by reduction in brake pipe pressure by other means than the brake valve device 15, and causes a smooth reduction of the vehicle at a rate of deceleration that is greater than the normal service rate of retardation as controlled by the retardation controller 6.

While I have illustrated and described one preferred embodiment of my invention, it will be apparent to those skilled in the art that many modifications thereof may be made within the spirit of my invention and I do not wish to be limited otherwise than by the scope of the appended claims.

Having now described my invention, what I claim as new and desire to secure by Letters Patent, is:

1. In a brake equipment for vehicles, a brake cylinder, magnet valve means for controlling the supply of fluid under pressure to said brake cylinder, an automatic valve device for controlling the supply of fluid under pressure to said brake cylinder, manually operable means for controlling the operation of said magnet valve means and of said automatic valve device, a retardation controller responsive to the rate of retardation of the vehicle for controlling the operation of said magnet valve means to effect a desired rate of retardation of the vehicle and means responsive to a reduction in brake pipe pressure for effecting the operation of said magnet valve means to apply the brake independently of the operation of said manually operable means.

2. In a brake equipment for vehicles, a brake cylinder, magnet valve means for controlling the supply of fluid under pressure to said brake cylinder, an automatic valve device for controlling the supply of fluid under pressure to said brake cylinder, manually operable means for controlling the operation of said magnet valve means and of said automatic valve device, a retardation controller device responsive to the rate of retardation of the vehicle for controlling the operation of said magnet valve means to effect a desired rate of retardation of the vehicle, means responsive to a reduction in brake pipe pressure for effecting the operation of said magnet valve means to apply the brakes independently of the operation of said manually operable means, and means responsive to a reduction in brake pipe pressure for effecting a change in the setting of said retardation controller to effect a greater rate of retardation of the vehicle.

3. In a brake equipment for vehicles, a brake cylinder, electrically operated means for controlling the supply of fluid under pressure to the brake cylinder to effect a service application of the brakes, an automatic valve device for effecting an automatic application of the brakes, an inertia controller device for controlling the electrically operated means for regulating the rate of retardation of the vehicle when electrically applied, and means operative upon an emergency automatic application of the brakes for effecting control of the brakes by said retardation controller device.

4. In a brake equipment for vehicles, a brake cylinder, electrically operated means for controlling the supply of fluid under pressure to the brake cylinder to effect a service application of the brakes, an automatic valve device for effecting an automatic application of the brakes, an inertia controlled device for controlling the electrically operated means for regulating the rate of retardation of the vehicle when electrically applied, means operative upon an emergency automatic application of the brakes for effecting control of the brakes by said retardation controller device, and means responsive to an emergency application of the brakes for changing the setting of the retardation controller device to effect a rate of retardation of the vehicle greater than that effected during service application of the brakes.

5. In a fluid pressure brake for vehicles, a brake cylinder, electrically operated means for controlling the supply of fluid under pressure to the brake cylinder, a brake pipe and triple valve means responsive to a reduction in brake pipe pressure for controlling the supply of fluid under pressure to said brake cylinder, a retardation controller for controlling said electrically operated means to control the rate of retardation of the vehicle, and means responsive to a reduction in brake pipe pressure at an emergency rate for transferring the control of the brakes to said electrically operated means.

6. In a fluid pressure brake for vehicles, a brake cylinder, electrically operated means for controlling the supply of fluid under pressure to the brake cylinder, a brake pipe, automatic valve means responsive to a reduction in brake pipe pressure for controlling the supply of fluid under pressure to said brake cylinder, a retardation controller for controlling said electrically operated means to control the rate of retardation of the vehicle, means responsive to a reduction in the brake pipe pressure at an emergency rate for transferring the control of the brakes to said electrically operated means, and means responsive to a reduction in brake pipe pressure for changing the setting of said retardation controller to effect a greater rate of retardation of the vehicle when the brakes are applied through operation of the automatic valve means than when applied electrically.

7. In a fluid pressure brake for vehicles, a brake cylinder, electrically operated means for controlling the supply of fluid under pressure to the brake cylinder, a brake pipe, automatic valve means responsive to a reduction in brake pipe pressure for controlling the supply of fluid under pressure to said brake cylinder, a brake valve device having an electrical self-lapping portion for controlling said electrically operated means and a rotary portion for controlling said brake pipe pressure, a retardation controller for controlling said electrically operated means upon electrical application of the brakes to control the rate of retardation of the vehicle, a pressure operated transfer switch, and a vent valve device having an emergency valve portion operated upon a reduction in brake pipe pressure at an emergency rate for effecting the supply of fluid under pressure to said transfer switch for effecting an application of the brakes through said electrically operated means.

8. In a fluid pressure brake for vehicles, a brake cylinder, a control valve device having a magnet valve portion and a triple valve portion operative for controlling the supply of fluid under pressure to, and the release of fluid under pressure from, said brake cylinder, a manually operable means for operating the magnet valve portion and the triple valve portion of said control valve device to effect the application of the brakes, and means responsive to emergency application of the brakes through operation of said triple valve portion for transferring the control of the application of the brakes to said electrically operated means.

9. In a fluid pressure brake for vehicles, a brake cylinder, a control valve device having a magnet valve portion and a triple valve portion, each for controlling the supply of fluid under pressure to, and the release of fluid under pressure from, said brake cylinder to apply the brakes, a brake pipe, a manually operable means for effecting operation of the magnet valve portion, and of the triple valve portion, of said control valve device to effect the application of the brakes, a retardation controller for controlling said magnet valve portion to limit the rate of retardation of the vehicle to a desired value, a transfer switch, a vent valve device having an emergency portion and a safety control portion, said emergency portion being responsive to a reduction in brake pipe pressure at an emergency rate to effect operation of said transfer switch to effect control of the brakes by said magnet valve portion, and safety means effecting operation of the safety control portion to cause operation of the emergency portion to effect an automatic application of the brakes.

10. In a fluid pressure brake for vehicles, a brake cylinder, a control valve device having a magnet valve portion and a triple valve portion, each for controlling the supply of fluid under pressure to, and the release of fluid under pressure from, said brake cylinder to apply the brakes, a brake pipe, a manually operable means for effecting operation of said magnet valve portion and of said triple valve portion of said control valve device to effect the application of the brakes, a retardation controller for controlling said magnet valve portion to limit the rate of retardation of the vehicle to a desired value, a transfer switch, a vent valve device having an emergency portion and a safety control portion, said emergency portion being responsive to a reduction in brake pipe pressure at an emergency rate to effect operation of said transfer switch to effect control of the brakes by said magnet valve portion, safety means for effecting operation of the safety control portion to cause operation of the emergency portion to effect an automatic application of the brakes, and means responsive to a reduction in brake pipe pressure for changing the setting of the retardation controller to effect an increased rate of retardation of the vehicle.

11. In a fluid pressure brake for vehicles, a brake cylinder, a control valve device having a magnet valve portion and a triple valve portion independently operative for controlling the supply of fluid under pressure to, and the release of fluid under pressure from, said brake cylinder to control the application and release of the brakes, a brake pipe, a manually operable means for effecting the operation of the magnet valve portion of said control valve device to effect the application of the brakes and for controlling brake pipe pressure to control the operation of said triple valve portion to effect the application and release of the brakes, a retardation controller, for controlling said magnet valve portion to limit the rate of retardation of the vehicle to a desired value, a transfer switch, a vent valve device having an emergency portion, said emergency portion being responsive to a reduction in brake pipe pressure at an emergency rate to effect the operation of said transfer switch to effect application and control of the brakes through said magnet valve portion, and means responsive to a reduction in brake pipe pressure at an emergency rate for changing the setting of the retardation controller to effect an increased rate of retardation of the brakes.

12. In a vehicle brake system, in combination, braking means, straight air means for controlling the application of the brakes, continuously operable automatic means for also controlling the application of the brakes, means for controlling the degree of braking when the brakes are applied by operation of said straight air means to limit the rate of retardation of the vehicle to a predetermined value, and means operative upon initiation of an application of the brakes by an emergency application of said automatic means for effecting operation of said straight air means to effect an application of the brakes.

ELLIS E. HEWITT.